US011777722B2

United States Patent
Lord

(10) Patent No.: US 11,777,722 B2
(45) Date of Patent: Oct. 3, 2023

(54) QKD METHOD

(71) Applicant: BRITISH TELECOMMUNICATIONS PUBLIC LIMITED COMPANY, London (GB)

(72) Inventor: Andrew Lord, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 17/759,683

(22) PCT Filed: Jan. 14, 2021

(86) PCT No.: PCT/EP2021/050643
§ 371 (c)(1),
(2) Date: Jul. 28, 2022

(87) PCT Pub. No.: WO2021/151676
PCT Pub. Date: Aug. 5, 2021

(65) Prior Publication Data
US 2023/0059630 A1  Feb. 23, 2023

(30) Foreign Application Priority Data
Jan. 31, 2020  (EP) ..................... 20154838

(51) Int. Cl.
*H04L 9/08* (2006.01)
*H04B 10/70* (2013.01)
*H04L 9/40* (2022.01)

(52) U.S. Cl.
CPC ........... *H04L 9/0852* (2013.01); *H04B 10/70* (2013.01); *H04L 63/062* (2013.01)

(58) Field of Classification Search
CPC ...... H04L 9/0852; H04L 63/062; H04B 10/70
See application file for complete search history.

(56) References Cited

U.S. PATENT DOCUMENTS

| 7,460,669 B2 * | 12/2008 | Foden | H04L 9/0858 |
| | | | 380/256 |
| 7,936,883 B2 * | 5/2011 | Imai | H04L 9/0852 |
| | | | 380/278 |

(Continued)

FOREIGN PATENT DOCUMENTS

| CN | 208433979 U | 1/2019 |
| GB | 2297448 A | 7/1996 |

(Continued)

OTHER PUBLICATIONS

Bennett C.H., et al., "Quantum Cryptography: Public Key Distribution and Coin Tossing," In Proceedings of IEEE International Conference on Computers, Systems and Signal Processing, Dec. 1984, vol. 175, 7 pages.

(Continued)

*Primary Examiner* — Baotran N To
(74) *Attorney, Agent, or Firm* — Patterson Thuente, P.A.

(57) ABSTRACT

There is herein provided a method of performing Quantum Key Distribution, the method including transmitting, in a first basis state, a first photon from a quantum transmitter to a quantum receiver; transmitting, in a second basis state, a second photon from the quantum transmitter to the quantum receiver, the second basis state being non-orthogonal to the first basis state and the transmitter and receiver being optically connected by both a first optical channel and a second optical channel, wherein transmitting the first photon from the quantum transmitter to the quantum receiver in the first basis state comprises: transmitting the first photon from the quantum transmitter to the quantum receiver along either the first optical channel or the second optical channel, wherein transmitting the second photon from the quantum transmitter to the quantum receiver in the second basis state comprises: transmitting a first portion of the probability distribution of the second photon from the transmitter to the (Continued)

receiver along the first optical channel; and transmitting a second portion of the probability distribution of the second photon from the transmitter to the receiver along the second optical channel.

12 Claims, 3 Drawing Sheets

(56) References Cited

U.S. PATENT DOCUMENTS

| | | | |
|---|---|---|---|
| 9,148,225 | B2* | 9/2015 | Lowans ............... H04B 10/70 |
| 10,735,328 | B2* | 8/2020 | Ochi ..................... H04L 9/08 |
| 2002/0097874 | A1 | 7/2002 | Foden et al. |
| 2008/0101612 | A1* | 5/2008 | Imai ................ H04L 9/0852 |
| | | | 380/278 |
| 2008/0175385 | A1 | 7/2008 | Lee et al. |
| 2009/0180615 | A1 | 7/2009 | Trifonov |
| 2010/0027794 | A1* | 2/2010 | Yuan ............... H04L 63/1466 |
| | | | 380/278 |
| 2010/0290626 | A1* | 11/2010 | Jenkins .............. H04B 10/90 |
| | | | 380/278 |
| 2014/0112478 | A1 | 4/2014 | Arahira |
| 2017/0237666 | A1 | 8/2017 | Ochi et al. |
| 2018/0062838 | A1* | 3/2018 | Godfrey ............. H04B 10/70 |
| 2021/0152346 | A1* | 5/2021 | Bucklew ............. H04B 10/66 |
| 2022/0294618 | A1 | 9/2022 | Lord |

FOREIGN PATENT DOCUMENTS

| | | |
|---|---|---|
| GB | 2430123 A | 3/2007 |
| GB | 2534917 A | 8/2016 |
| GB | 2536248 A | 9/2016 |
| IE | 20020742 A1 | 4/2003 |
| WO | WO-2009145392 A1 | 12/2009 |
| WO | WO-2019070347 A1 | 4/2019 |

OTHER PUBLICATIONS

Bennett C.H., et al., "Quantum Cryptography: Public Key Distribution and Coin Tossing," Theoretical Computer Science, 2014, vol. 560, pp. 7-11.

Combined Search and Examination Report under Sections 17 and 18(3) for Great Britain Application No. 2110994.7, dated May 3, 2022, 10 pages.

Examination Report under 18(3) for Great Britain Application No. 2001339.7, dated Jun. 6, 2022, 3 pages.

Examination Report under 18(3) for Great Britain Application No. 2001339.7, dated Nov. 30, 2021, 3 pages.

Extended European Search Report for Application No. 20154838.5, dated Jun. 23, 2020, 5 pages.

Gobby C., et al., "Quantum Key Distribution Over 122 Km of Standard Telecom Fiber," Applied Physics Letters, 2004, vol. 84, 14 pages.

Hugues-Salas E., et al., "Monitoring and Physical-Layer Attack Mitigation in SDN-Controlled Quantum Key Distribution Networks," Journal of Optical Communications and Networking, Feb. 2019, vol. 11, No. 2, 10 pages.

International Search Report and Written Opinion for Application No. PCT/EP2021/050643 dated Feb. 25, 2021, 13 pages.

Search Report under Section 17(5) for Great Britain Application No. 2001339.7, dated Oct. 27, 2020, 4 pages.

Zhang Y., et al., "Generalized PPM-based BB84 QKD Protocol," Disclosure 3: ICTON 2014 Tu.B1.5, 2014, 4 pages.

Combined Search and Examination Report for Great Britain Application No. 1914062.3, dated May 6, 2020, 7 pages.

Examination Report for Great Britain Application No. 1914062.3, dated Dec. 3, 2021, 7 pages.

Examination Report under Section 18(3) for Great Britain Application No. 1914062.3, dated Apr. 26, 2022, 3 pages.

Extended European Search Report for Application No. 19200429.9, dated Mar. 2, 2020, 7 pages.

Hugues-Salas E., et al., "Monitoring and Physical-Layer Attack Mitigation in SDN-Controlled Quantum Key Distribution Networks," Journal of Optical Communications and Networking, IEEE, USA, Feb. 1, 2019, vol. 11, No. 2, XP011712648, ISSN: 1943-0620, DOI: 10.1364/JOCN.11.00A209 [retrieved on Feb. 28, 2019], 10 pages.

International Preliminary Report on Patentability and Written Opinion for Application No. PCT/EP2020/073086, dated Apr. 5, 2022, 8 pages.

International Preliminary Report on Patentability for Application No. PCT/EP2021/050643, dated Aug. 11, 2022, 10 pages.

International Search Report and Written Opinion for Application No. PCT/EP2020/073086, dated Oct. 20, 2020, 11 pages.

International Search Report and Written Opinion for Application No. PCT/EP2022/069591, dated Nov. 7, 2022, 14 pages.

Stucki D., et al., "Fast and Simple One-Way Quantum Key Distribution," Applied Physics Letters, Jun. 13, 2005, 4 pages.

* cited by examiner

QKD METHOD

PRIORITY CLAIM

The present application is a National Phase entry of PCT Application No. PCT/EP2021/050643, filed Jan. 14, 2021, which claims priority from EP Patent Application No. 20154838.5, filed Jan. 31, 2020, each of which is hereby fully incorporated herein by reference.

BACKGROUND

Quantum Key Distribution (QKD) is a method for distributing a secret quantum key between two parties. One commonly-used QKD protocol is the BB84 protocol. It works by encoding a photon with a bit value of 1 or 0 and transmitting the encoded photon in one of two non-orthogonal basis states. The original implementation of the BB84 protocol achieved this by transmitting the photon in one of two non-orthogonal polarization states. The receiver measures the photon using a polarizer oriented to correspond with one of the two polarization states. If the orientation of the polarizers used by the transmitter and receiver are the same, the receiver will measure the correct encoded bit value. If they are different, the receiver will measure a random bit value.

Other ways of implementing BB84 have since been developed. In one implementation, two different phase states, rather than polarization states, are used. Both phase-based and polarization based implementations involve costly equipment (such as polarization modulators). It would be desirable to find a cheaper alternative implementation.

SUMMARY

According to a first aspect of the disclosure there is provided a method of performing Quantum Key Distribution, the method comprising: transmitting, in a first basis state, a first photon from a quantum transmitter to a quantum receiver; transmitting, in a second basis state, a second photon from the quantum transmitter to the quantum receiver, the second basis state being non-orthogonal to the first basis state and the transmitter and receiver being optically connected by both a first optical channel and a second optical channel, wherein transmitting the first photon from the quantum transmitter to the quantum receiver in the first basis state comprises: transmitting the first photon from the quantum transmitter to the quantum receiver along either the first optical channel or the second optical channel, wherein transmitting the second photon from the quantum transmitter to the quantum receiver in the second basis state comprises: transmitting a first portion of the probability distribution of the second photon from the transmitter to the receiver along the first optical channel; and transmitting a second portion of the probability distribution of the second photon from the transmitter to the receiver along the second optical channel.

This disclosure is advantageous over conventional approaches because, for example, it enables a method of QKD to be performed without expensive and complex equipment. It also enables a more secure QKD method to be performed. This is because first optical channel may be spatially separated from the second optical channel, making it more difficult for an eavesdropper to intercept a signal from both channels.

Transmitting the first photon in the first basis state may be performed before or after transmitting the second photon in the second basis state.

There may be a phase difference between the first and the second portions of the probability distribution of the second photon. The phase difference may be $\pi/2$. The method may further comprise using a splitter to split the second photon into the first and the second portions of the probability distribution. The splitter may have a plurality of inputs. The method may further comprise inputting the second photon into a first input of the splitter or into a second input of the splitter. In some embodiments the splitter is a 2×2 splitter, however alternative embodiments are also envisaged. By 2×2 splitter, it is meant that the splitter has two inputs and two outputs. Inputting the second photon into the first input of the splitter may constitute encoding a bit value of 1 onto the second photon. Inputting the second photon into the second input of the splitter may constitute encoding a bit value of 0 onto the second photon. In either case, the phase of the output signal at one of the outputs of the splitter may lag that of the output signal put at the other output. This phase lag may be $\pi/2$.

The splitter may apply the phase lag to the signal. For example, a 2×2 splitter has first and second inputs and first and second outputs. The first input corresponds to the first output and the second input corresponds to the first output. This means that, when a photon is input at the first input and the splitter outputs a portion of the photon's probability density at each output, the portion output at the second output has a phase lag of $\pi/2$ relative to the portion output at the first output.

The method may further comprise determining whether to transmit in the first basis state or the second basis state. This may involve the output of a random number generator. The method may further comprise encoding a bit value of 1 or 0 onto the first photon or the second photon. This may comprise determining the bit value to be encoded using a random number generator. Transmitting the first photon along the first optical channel may constitute transmitting a bit value of 1. Transmitting the first photon along the first optical channel may constitute transmitting a bit value of 0.

In some embodiments the first and/or second optical channels are two separate optical fibers. The two optical fibers may be located within the same fiber core. Alternatively, the two optical fibers may have a mutual spatial separation for at least a portion of their respective lengths. The maximum spatial separation may be at least 10 meters or may be at least 100 meters or may be at least 1 kilometer. In alternative embodiments the first and/or second optical channels are different modes within the same fiber.

The method may further comprise generating the first and/or second photons using a photon generator.

The method may further comprise, at the receiver, detecting the first and/or second photon. This may comprise detecting the photon in either the first basis state or the second basis state. If detecting using the first basis state, the output of the first and second optical channels may be directed into respective photodetectors.

If detecting using the second basis state the method may comprise combining a portion of the output signal of the first optical channel with a portion of the output signal of the second optical channel. The method may further comprise combining a further portion of the output signal of the first optical channel with a further portion of the output signal of the second optical channel. This may be achieved by directing the output signals of the first and second optical channels into respective inputs of an optical splitter. The splitter may be a 2×2 splitter. The outputs of the splitter may be directed into respective photodetectors. The splitter may split each of its input signals into the two portions. One of the portions of each input signal may be combined together to produce the output signal at one of the outputs. The other portion of each input may be combined together to give the output signal at the other output.

The method may further comprise determining whether to detect in the first or second basis state. This may involve using a random number generator to determine a random number. This may further comprise directing the output of the first and second optical channels into first and second switches respectively. The first and second switches may be controlled using the output of the random number generator.

The method may further comprise performing the key agreement stage of QKD between the transmitter and receiver over a classical channel. The shared quantum key may then be determined, as in conventional QKD.

In some embodiments the transmitter comprises a plurality of sub transmitters. Transmitting, in a first basis state, a first photon from a quantum transmitter to a quantum receiver may comprise transmitting the first photon from a first sub transmitter. Alternatively this may comprise transmitting the first photon from the first sub transmitter if a bit value of 1 is to be encoded and transmitting the first photon from a second sub transmitter if a bit value of 0 is to be encoded.

Transmitting, in a second basis state, a second photon from the quantum transmitter to the quantum receiver, may comprise transmitting the second photon from a third sub transmitter. Alternatively this may comprise transmitting the second photon from the third sub transmitter if a bit value of 1 is to be encoded and transmitting the second photon from a fourth sub transmitter if a bit value of 0 is to be encoded.

According to a second aspect of the disclosure there is provided a system for performing Quantum Key Distribution, the system comprising, a quantum transmitter and a quantum receiver, the quantum transmitter being optically connected to the quantum receiver by both a first optical channel and a second optical channel, the quantum transmitter being adapted to transmit a first photon to the quantum receiver along either the first optical channel or the second optical channel; the quantum transmitter being further adapted to transmit a first portion of the probability distribution of the second photon from the transmitter to the receiver along the first optical channel; and being further adapted to transmit a second portion of the probability distribution of the second photon from the transmitter to the receiver along the second optical channel.

BRIEF DESCRIPTION OF THE DRAWINGS

An embodiment of the disclosure will now be described in detail, for illustration only, and with reference to the appended drawings, in which:

As in conventional BB84 implementations, Alice encodes a photon with a randomly-chosen value of 0 or 1. Alice transmits the encoded photon to Bob in one of two randomly-chosen basis states. In the present invention, however, Alice is connected to Bob by two channels, rather than one. FIG. 1 is a schematic view of the apparatus constituting Alice in the present invention (Alice being the upstream end of the QKD system). Please note that the arrows shown in the figures represent optical fibers, the direction of the arrowhead indicating the direction of transmission of photons through the fiber.

Figure 1:
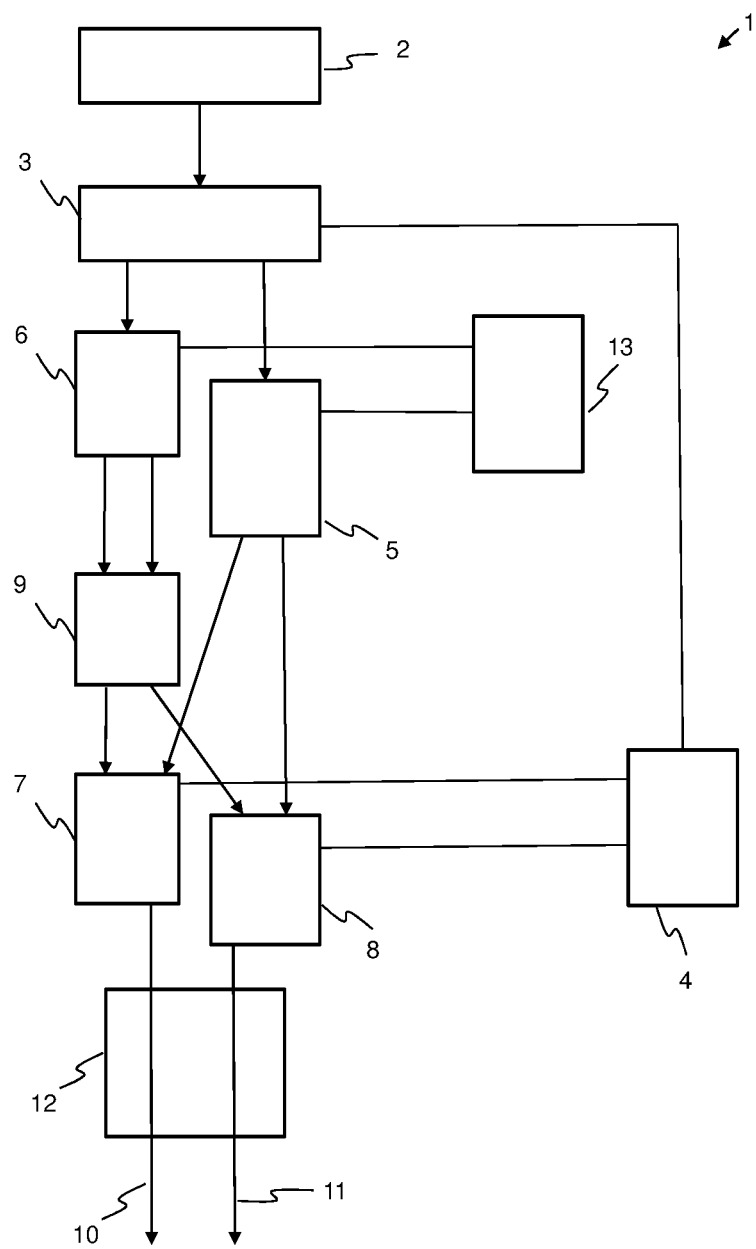
FIG. 1 is a schematic view of the upstream (Alice) end of a QKD system for performing an embodiment of the disclosure.

Alice is shown generally at 1. The basis features of Alice will now be described. Alice 1 comprises a single photon generator 2, which provides an optical input to an optical switch 3. Optical switch 3 is switchable between two outputs, the first of which provides an optical input to optical switch 5 and the second of which provides an optical input to optical switch 6. Switch 3 receives an input signal from first random number generator 4. The switching position of switch 3 depends on this input signal. Optical switches 5 and 6 are each switchable between two outputs. The two outputs of optical switch 5 provide respective inputs to optical switches 7 and 8. The two outputs of optical switch 6 each provide an input to a 2×2 50/50 optical splitter 9. The two outputs of splitter 9 provide respective inputs to switches 7 and 8. Optical switches 7 and 8 also each receive an input from random number generator 4. Switches 7 and 8 therefore each have two inputs and one output. The switching positions of switches 7 and 8 depend on the input from random number generator 4. The outputs of switches 7 and 8 provide inputs to optical fibers 10 and 11 respectively. Fibers 10 and 11 are held within a binder 12 and extend to Bob (Bob being the downstream end of the QKD system).

In use, photon generator 2 transmits a photon to switch 3. Switch 3 receives a control signal from first random number generator 4, indicating whether the photon is to be transmitted in the first or second basis state. If the control signal indicates that the photon is to be transmitted in the first basis state, switch 3 outputs the photon to switch 5. If, alternatively, the control signal indicates that the photon is to be transmitted in the second basis state, switch 3 outputs the photon to switch 6. Each of switches 5 and 6 receive a control signal from a second random number generator 13. The control signal indicates whether a bit value of "1" or "0" should be encoded onto the photon. If the control signal indicates that a bit value of 1 is to be encoded, the switching positions of switches 5 and 6 are positioned such that any input photon is output on the left-side output as seen in FIG. 1, and no photon is output on the right-side output. If, alternatively, the control signal indicates that a bit value of 0 is to be encoded, the switching positions of switches 5 and 6 are positioned such that any input photon is output on the right-side output as seen in FIG. 1, and no photon is output on the left-side output.

Therefore, if a bit value of 1 is to be encoded, switch 5 outputs a photon from its left-side output and the photon arrives at the right-side input of switch 7. If a bit value of 0 is to be encoded, switch 5 outputs a photon from its right-side output and the photon arrives at the right-side input of switch 8. Switches 7 and 8 also receive an input from random number generator 4. This input is the same as that received by switch 3 from random number generator 4. The input is therefore indicative of the chosen basis state. If this signal indicates that the first basis state has been chosen, switches 7 and 8 ensure that it is their right-side inputs (i.e. the inputs they receive from switch 5) that switches 7 and 8 output onto fibers 10 and 11 respectively.

Therefore, if the first basis state has been chosen and a bit value of 1 is to be encoded, the sequence of events is: photon generator 2-switch 3-switch 5-switch 7-fiber 10. If the first basis state has been chosen and a bit value of 0 is to be encoded, the sequence of events is: photon generator 2-switch 3-switch 5-switch 8-fiber 11.

If the photon is to be transmitted in the second basis state, switch 3 outputs the photon to switch 6. As mentioned above, if the control signal switch 6 receives from random number generator 13 indicates that a bit value of 1 is to be encoded, switch 6 outputs the photon to the left-side input of splitter 9, as seen in FIG. 1. The splitter 9 splits the photon signal (i.e. the probability wave of the photon) between the left-side and right-side outputs of splitter 9. The phase of the photon signal at the right-side output lags behind the phase of the signal at the left-side output by pi/2 as it has propagated along a "diagonal path" through the splitter 9. A "diagonal path" in this context refers to the path through the splitter 9 from either the left-side input to the right-side output or from the right-side input to the left side output. Splitter 9 therefore outputs a portion of the photon signal to the left-side input of switch 7 and outputs the other portion of the photon signal to the left-side input of switch 8. As the second basis state has been chosen, random number generator 4 controls the switching positions of switches 7 and 8 to connect the respective left-side inputs to their outputs. Therefore one portion of the photon signal is output onto fiber 10 and the other is output onto fiber 11. The portion of the photon signal output onto fiber 11 lags the portion of the photon signal output onto fiber 10 by pi/2.

If, alternatively, a bit value of 0 is to be encoded in the second basis state, switch 6 outputs the photon it has received from switch 3 to the right-side input of splitter 9, as seen in FIG. 1. The splitter 9 splits the photon signal (i.e. the probability wave of the photon) between the left-side and right-side outputs of splitter 9. This time the phase of the photon signal at the left-side output lags behind the phase of the signal at the right-side output by pi/2 as it has propagated along a "diagonal path" through the splitter 9. The diagonal path taken is from the right-side input to the left-side output. As the second basis state has been chosen, random number generator 4 controls the switching positions of switches 7 and 8 to connect the respective left-side inputs to their outputs. Therefore one portion of the photon signal is output onto fiber 10 and the other is output onto fiber 11. The portion of the photon signal output onto fiber 10 lags the portion of the photon signal output onto fiber 11 by pi/2.

Figure 2:
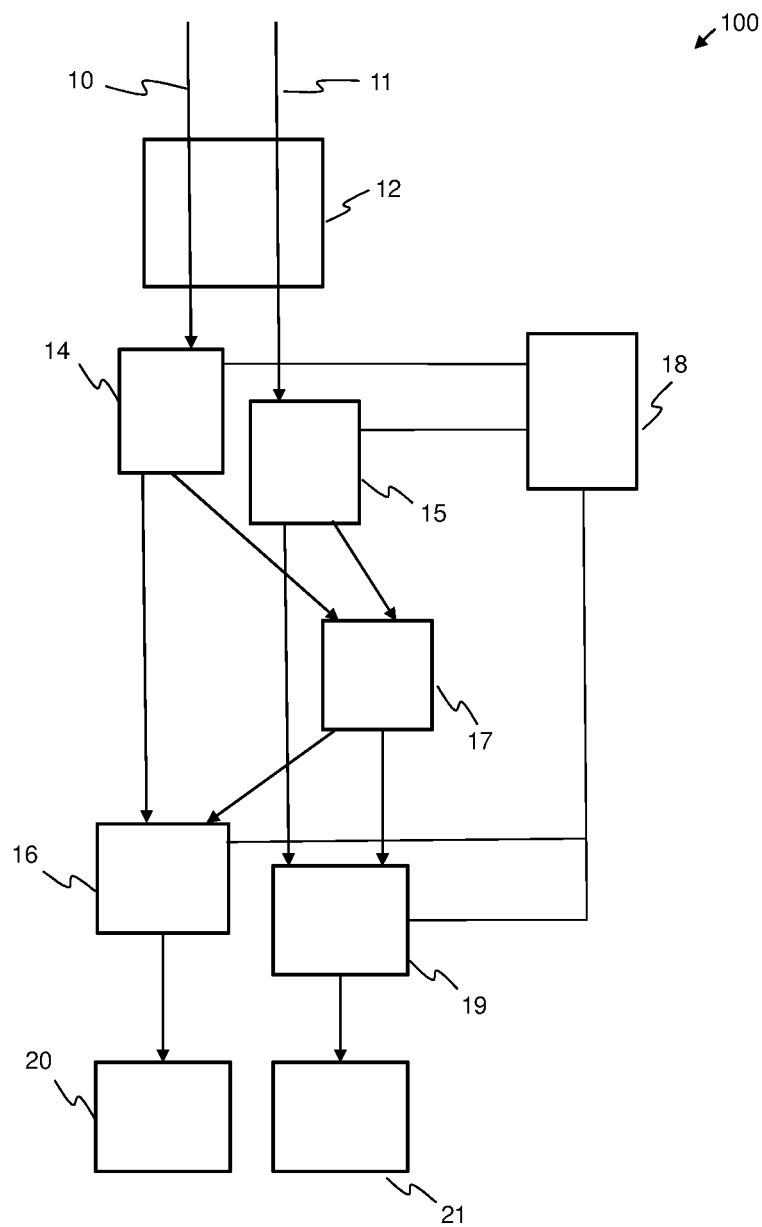
FIG. 2 is a schematic view of the downstream (Bob) end of a QKD system for performing an embodiment of the disclosure.

Turning now to FIG. 2, the arrangement at the downstream end of the QKD system (i.e. Bob) is shown generally at 100. The fibers 10 and 11 extend from Alice to Bob. At Bob, fiber 10 provides an input to switch 14, which has two outputs. The first output of switch 14 provides an input to switch 16. The second output of switch 14 provides an input to a 2×2 50/50 splitter 17. Fiber 11 provides an input to switch 15, which has two outputs. The first output of switch 15 provides an input to a switch 19 and the second provides an input to the 2×2 50/50 splitter 17. The left-side output (as seen in FIG. 2) of switch 17 provides an input to switch 16 and the right-side output provides an input to switch 19. The output of switch 16 provides an input to photodetector 20 and the output of switch 19 provides an input to photodetector 21.

Switches 14, 15, 16 and 19 each receive a control signal from random number generator 18. This control signal determines in which basis state Bob will measure the incoming photon. If the control signal indicates that the photon will be measured in the first basis state, switches 14 and 15 are switched so as to connect their inputs to their left-side outputs, i.e. so as to connect switch 14 to switch 16 and to connect switch 15 to switch 19. If, alternatively, the control signal indicates that the photon will be measured in the second basis state, switches 14 and 15 are switched so as to connect their inputs to their right-side outputs, i.e. so as to connect switch 14 to the left-side input to splitter 17 and to connect switch 15 to the right-side input to splitter 17. The left-side output of splitter 17 connects to switch 16 and the right-side output of splitter 17 connects to switch 19. Switches 16 and 19 also receive the control signal from random number generator 18. If the control signal indicates that the photon will be measured in the first basis state, switches 16 and 19 are switched to connect their left-side inputs to their outputs. If, alternatively, the control signal indicates that the photon will be measured in the second basis state, switches 16 and 19 are switched to connect their right-side inputs to their outputs.

Alice and Bob Both Use First Basis State: Bit Value=1

An example will now be described in which Bob receives a photon which Alice encoded with a bit value of 1 in the first basis state, and Bob measures the photon in the first basis state. In this situation a photon propagates along fiber 10 and arrives at switch 14 of Bob. No photon propagates along fiber 11. Switch 14 receives a control signal that the photon will be measured in the first basis state and so switch 14 directs the photon to switch 16. Switch 16 also receives the control signal from random number generator 18 and so connects its left-side input to its output, allowing the photon to arrive at photodetector 20. Detecting a photon at photodetector 20 is indicative of a bit value of 1. The outcome of Bob's measurement therefore matches the bit value Alice encoded onto the photon.

Alice and Bob Both Use First Basis State: Bit Value=0

An example will now be described in which Bob receives a photon which Alice encoded with a bit value of 0 in the first basis state, and Bob measures the photon in the first basis state. In this situation a photon propagates along fiber 11 and arrives at switch 15 of Bob. No photon propagates along fiber 10. Switch 15 receives a control signal that the photon will be measured in the first basis state and so switch 15 directs the photon to switch 19. Switch 19 also receives the control signal from random number generator 18 and so connects its left-side input to its output, allowing the photon to arrive at photodetector 21. Detecting a photon at photodetector 21 is indicative of a bit value of 1. The outcome of Bob's measurement therefore matches the bit value Alice encoded onto the photon.

Alice and Bob Both Use Second Basis State: Bit Value=1

An example will now be described in which Bob receives a photon which Alice encoded with a bit value of 1 in the second basis state, and Bob measures the photon in the second basis state. As mentioned above, in this situation, Alice outputs a portion of the photon onto each of fibers 10 and 11. The phase portion on fiber 11 lags the portion on fiber 10 by pi/2. The two portions arrive at switches 14 and 15 of Bob respectively. The control signal from random number generator 18 instructs switches 14 and 15 to output their input signals to the respective inputs of splitter 17. Splitter 17 splits each of the two inputs between its two outputs. In particular, half of the signal received at the left-side input of splitter 17 is output at the left-side output and the other half is output at the right-side output. Similarly, half of the signal received at the right-side input of splitter 17 is output at the left-side output and the other half is output at the right-side output. Thus, the left-side output of splitter 17 comprises a component from the left side input and a component from the right-side input. The component from the left-side input has passed through splitter 17 "directly" (i.e. from left-side input to left-side output), whereas the component from the right-side input has passed through splitter 17 "diagonally" (i.e. from right-side input to left-side output). This diagonal path introduces a further lag of pi/2. Therefore the component from the right-side input has a lag of pi (i.e. pi/2+pi/2) relative to the component from the left-side input. This phase difference of pi causes destructive interference between the two components resulting in a zero signal at the left-side output of splitter 17.

Similarly, the right-side output of splitter 17 comprises a component from the left side input and a component from the right-side input. The component from the left-side input has passed through splitter 17 "diagonally" (i.e. from left-side input to right-side output). This diagonal path introduces a phase lag of pi/2. The component from the right-side input has passed through splitter 17 "directly" (i.e. from right-side input to right-side output). This direct path does not introduce a phase lag. However, the component from the right-side input has a phase lag of pi from passing diagonally through splitter 9 of Alice. Therefore both component signals at the right-side output of splitter 17 have a phase lag of pi/2. This causes constructive interference between the two components resulting in a photon at the right-side output of splitter 17. This photon passes to photodetector 21 via splitter 19. No photon is detected by photodetector 20 as not photon was output from the left-side output of splitter 19. The detection of a photon at photodetector 21 indicates a bit value of 1. The outcome of Bob's measurement therefore matches the bit value Alice encoded onto the photon.

Alice and Bob Both Use Second Basis State: Bit Value=0

An example will now be described in which Bob receives a photon which Alice encoded with a bit value of 0 in the second basis state, and Bob measures the photon in the second basis state. As mentioned above, in this situation, Alice outputs a portion of the photon onto each of fibers 10 and 11. The phase portion on fiber 10 lags the portion on fiber 11 by pi/2. The two portions arrive at switches 14 and 15 of Bob respectively. The control signal from random number generator 18 instructs switches 14 and 15 to output their input signals to the respective inputs of splitter 17. As mentioned above, the left-side output of splitter 17 comprises a component from the left side input and a component from the right-side input. The component from the left-side input passes through splitter 17 "directly" (i.e. from left-side input to left-side output) and so no phase lag is introduced. However, the component from the left-side input already has a phase lag of pi/2, introduced by the splitter 9 in Alice. The component from the right-side input passes through splitter 17 "diagonally" (i.e. from right-side input to left-side output), introducing a phase lag of pi/2. Therefore the components from the left-side and right-side inputs have a phase lag of pi/2. This causes constructive interference between the two components resulting in a photon at the left-side output of splitter 17. This photon passes to photodetector 20 via splitter 16.

Similarly, the right-side output of splitter 17 comprises a component from the left side input and a component from the right-side input. The component from the left-side input passes through splitter 17 "diagonally" (i.e. from left-side input to right-side output), introducing a phase lag of pi/2. Furthermore, the component from the right-side input has an existing phase lag of pi/2 from passing diagonally through splitter 9 of Alice, resulting in a total phase lag of pi (i.e. pi/2+pi/2). The component from the right-side input has passed through splitter 17 "directly" (i.e. from right-side input to right-side output), introducing no phase lag. This phase lag of pi between the two components causes destructive interference between the two components resulting in a zero signal at the right-side output of splitter 17. As a result, the right-side output of splitter 17 does not output a photon and so no photon is detected at photodetector 21. Detecting a photon at photodetector 20 and not at photodetector 21 is indicative of a bit value of 0. The outcome of Bob's measurement therefore matches the bit value Alice encoded onto the photon.

Therefore, when Bob measures in the same basis state Alice used, Bob measures the same bit value that Alice encoded. Situations when Bob uses a different basis state to Alice will now be described.

Alice Uses First Basis State and Bob Uses Second Basis State: Bit Value=1

As mentioned above, if Alice encodes a bit value of 1 using the first basis state, Alice will output a photon onto fiber 10 and no photon onto fiber 11. If the random number generator 18 of Bob determines that Bob will measure in the second (i.e. the incorrect) basis state, switch 14 will direct the incoming photon to the left-side input of splitter 17. No photon will be received at the right-side input of splitter 17. This means that the outputs of splitter 17 will each output a portion of the incoming photon to switches 16 and 19 respectively. The random number generator 18 causes the switches 16 and 19 to output the photon portions to photodetectors 20 and 21 respectively. As quantum physics dictates that it is not possible to measure portions of a photon, the two portions collapse into a single photon which arrives at one of the detectors at random. Thus the bit value detected by Bob is a random value of 1 or 0 and may not be the same as the bit value Alice encoded onto the photon.

Alice Uses First Basis State and Bob Uses Second Basis State: Bit Value=0

Similarly, if Alice encodes a bit value of 0 using the first basis state, Alice will output a photon onto fiber 11 and no photon onto fiber 10. If the random number generator 18 of Bob determines that Bob will measure in the second (i.e. the incorrect) basis state, switch 15 will direct the incoming photon to the right-side input of splitter 17. No photon will be received at the left-side input of splitter 17. This means that the outputs of splitter 17 will each output a portion of the incoming photon to switches 16 and 19 respectively. The random number generator 18 causes the switches 16 and 19 to output the photon portions to photodetectors 20 and 21 respectively. As quantum physics dictates that it is not possible to measure portions of a photon, the two portions collapse into a single photon which arrives at one of the detectors at random. Thus the bit value detected by Bob is a random value of 1 or 0 and may not be the same as the bit value Alice encoded onto the photon.

Alice Uses Second Basis State and Bob Uses First Basis State; Bit Value=1

As mentioned above, in this situation Alice transmits a portion of the photon on 10 and a portion on 11, (the portion on 11 lagging the portion on 10 by pi/2). As Bob is measuring in the first basis state, then, as mentioned above, switches 14 and 15 direct their respective photon portions to photodetectors 20 and 21 respectively, via switches 16 and 19 respectively. As quantum physics dictates that it is not possible to measure portions of a photon, the two portions collapse into a single photon which arrives at one of the detectors at random. Thus the bit value detected by Bob is a random value of 1 or 0 and may not be the same as the bit value Alice encoded onto the photon.

Alice Uses Second Basis State and Bob Uses First Basis State: Bit Value=0

As mentioned above, in this situation Alice transmits a portion of the photon on 10 and a portion on 11, (the portion on 10 lagging the portion on 11 by pi/2). As Bob is measuring in the first basis state, then, as mentioned above, switches 14 and 15 direct their respective photon portions to photodetectors 20 and 21 respectively, via switches 16 and 19 respectively. As quantum physics dictates that it is not possible to measure portions of a photon, the two portions collapse into a single photon which arrives at one of the detectors at random. Thus the bit value detected by Bob is a random value of 1 or 0 and may not be the same as the bit value Alice encoded onto the photon.

To summarize, if Alice and Bob use the same basis state in relation to a given photon, Bob will measure the same bit value Alice encoded. If Alice and Bob use different basis states in relation to a given photon. Bob will measure a random value.

Embodiments of this disclosure are beneficial as it does not require, e.g. the complex phase or polarization modulators required by some other QKD protocols. All that is required are low tech components, e.g. switches, beam splitters and two optical fiber channels.

Eavesdropper

Figure 3:
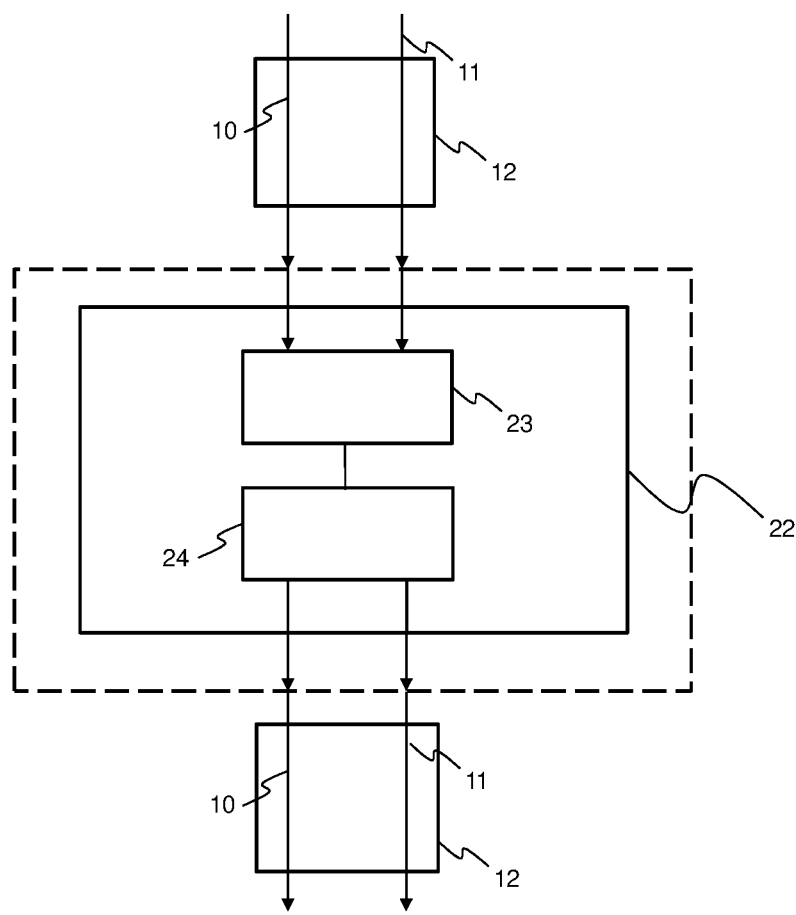
FIG. 3 is a schematic view of an eavesdropper (Eve) located between Alice and Bob, and intercepting photons from Alice.

In other BB84 protocols, an eavesdropper (known as Eve) may tap into the optical fiber link between Alice and Bob in an attempt to determine the quantum key. To do this Eve measures the photons from Alice in a basis state chosen at random by Eve. Eve then immediately sends replicas of the intercepted photons on to Bob, the replicas being encoded with the same bit value Eve measured. Eve does this to fool Bob into thinking that no interception has taken place. Eve's aim is to use the measured bit values to determine the quantum key. A schematic drawing of a possible Eve is shown in FIG. 3. Eve is shown at 22. Eve has a receiver portion 23 which is identical in structure to Bob in FIG. 2. Eve also has a transmitter portion 24 for encoding and transmitting the replica photons to Bob. In FIG. 3, Eve has cut the fibers 10, 11 linking Alice and Bob and inserted herself into the gap.

As with Bob, if, when measuring the incoming photon from Alice, Eve 22 uses the same basis state Alice used, Eve 22 will measure the bit value Alice encoded. And as with Bob, if Alice uses a different basis state to Alice, Eve will measure a random value. Therefore, the bit values Eve encodes will be different to the bit values Alice encoded for many of the photons. This will be detectable after the quantum transmission stage has finished and Bob sends Alice a string of bit values Bob measured along with the basis states Bob used. If Eve is present, Alice will notice that many of the bit values are wrong.

The invention claimed is:

1. A method of performing Quantum Key Distribution, the method comprising:
   transmitting, in a first basis state, a first photon from a quantum transmitter to a quantum receiver;
   transmitting, in a second basis state, a second photon from the quantum transmitter to the quantum receiver, the second basis state being non-orthogonal to the first basis state, and the quantum transmitter and the quantum receiver being optically connected by both a first optical channel and a second optical channel,
   wherein transmitting the first photon from the quantum transmitter to the quantum receiver in the first basis state comprises:
   transmitting the first photon from the quantum transmitter to the quantum receiver along either the first optical channel or the second optical channel,
   wherein transmitting the second photon from the quantum transmitter to the quantum receiver in the second basis state comprises:
   transmitting a first portion of a probability distribution of the second photon from the quantum transmitter to the quantum receiver along the first optical channel; and
   transmitting a second portion of the probability distribution of the second photon from the quantum transmitter to the quantum receiver along the second optical channel.

2. The method as claimed in claim 1, wherein there is a phase difference between the first portion and the second portion of the probability distribution of the second photon.

3. The method as claimed in claim 2, wherein the phase difference is $\pi/2$.

4. The method as claimed in claim 1, further comprising using an optical splitter to split the second photon into the first portion and the second portion of the probability distribution.

5. The method as claimed in claim 4, wherein the optical splitter is a 2×2 optical splitter.

6. The method as claimed in claim 5, wherein inputting the second photon into the first input of the optical splitter constitutes encoding a bit value of 1 onto the second photon and inputting the second photon into the second input of the optical splitter constitutes encoding a bit value of 0 onto the second photon.

7. The method as claimed in claim 1, wherein at least one of the first optical channel or the second optical channel are optical fibers and are located within the same fiber core.

8. The method as claimed in claim 1, wherein the first optical channel and the second optical channel have a mutual spatial separation for at least a portion of their respective lengths.

9. The method as claimed in claim 1, further comprising, at the quantum receiver, directing the output signals of the first optical channel and the second optical channel into respective inputs of an optical splitter.

10. The method as claimed in claim 9, wherein the optical splitter is a 2×2 optical splitter.

11. A system for performing Quantum Key Distribution, the system comprising:
    a quantum transmitter and a quantum receiver, the quantum transmitter being optically connected to the quantum receiver by both a first optical channel and a second optical channel, the quantum transmitter being adapted to transmit a first photon to the quantum receiver along either the first optical channel or the second optical channel, the quantum transmitter being further adapted to transmit a first portion of a probability distribution of the second photon from the quantum transmitter to the quantum receiver along the first optical channel and being further adapted to transmit a second portion of the probability distribution of the second photon from the quantum transmitter to the quantum receiver along the second optical channel.

12. The system as claimed in claim 11, wherein the quantum transmitter comprises a plurality of sub transmitters.

* * * * *